(12) United States Patent
Arnold

(10) Patent No.: US 7,079,115 B2
(45) Date of Patent: Jul. 18, 2006

(54) DATA INPUT

(75) Inventor: Steve Arnold, Yateley (GB)

(73) Assignee: Nokia Mobile Phones Limited, Espoo (FI)

( * ) Notice: Subject to any disclaimer, the term of this patent is extended or adjusted under 35 U.S.C. 154(b) by 381 days.

(21) Appl. No.: 09/893,419

(22) Filed: Jun. 29, 2001

(65) Prior Publication Data
US 2002/0030700 A1   Mar. 14, 2002

(30) Foreign Application Priority Data
Jun. 30, 2000   (GB) ................. 0016066.3

(51) Int. Cl.
*G09G 5/08*   (2006.01)
(52) U.S. Cl. ................. 345/161; 345/157
(58) Field of Classification Search ........... 345/161, 345/157, 467, 469, 699, 156; 379/354, 387.01; 702/2–5; 358/1.15; 348/734; 705/10; 463/25; 715/841
See application file for complete search history.

(56) References Cited

U.S. PATENT DOCUMENTS

| | | | |
|---|---|---|---|
| 4,680,728 A | 7/1987 | Davis, II et al. ............ 345/467 |
| 4,825,019 A | 4/1989 | Fisher ........................ 200/6 A |
| 5,410,326 A * | 4/1995 | Goldstein ................. 348/734 |
| 5,638,438 A * | 6/1997 | Keen ........................... 379/354 |
| 5,856,827 A * | 1/1999 | Sudo ........................... 715/841 |
| 5,870,689 A * | 2/1999 | Hale et al. ..................... 702/5 |
| 6,021,193 A * | 2/2000 | Thomas .................. 379/387.01 |
| 6,100,994 A * | 8/2000 | Schliekelmann et al. .. 358/1.15 |
| 6,623,357 B1 * | 9/2003 | Chowdhury ................ 463/25 |
| 6,822,634 B1 * | 11/2004 | Kemp et al. ................ 345/156 |
| 2004/0233159 A1 * | 11/2004 | Badarneh ................... 345/156 |
| 2005/0251440 A1 * | 11/2005 | Bednarek ..................... 705/10 |

FOREIGN PATENT DOCUMENTS

| | | |
|---|---|---|
| EP | 313207 | 4/1989 |
| EP | 0 685 953 A1 | 12/1995 |
| EP | 1 014 253 A1 | 6/2000 |
| GB | 2332293 | 6/1999 |

* cited by examiner

*Primary Examiner*—Bipin Shalwala
*Assistant Examiner*—Prabodh Dharia
(74) *Attorney, Agent, or Firm*—Alston & Bird LLP

(57) ABSTRACT

An apparatus is disclosed for selecting an item from a predetermined set of items. The apparatus comprises a user interface comprising an input having a plurality of actuators, and an output. It further comprises control means for controlling the user interface to provide a first menu selection comprising a plurality of items not exceeding the number of actuators, and selection means responsive to operation of the actuators for selecting the item from the menu associated with the operated actuator. The control means controls the user interface to provide a further menu selection in response to selection of an item, at least one item of the further menu selection representing a subset of the selected item.

20 Claims, 6 Drawing Sheets

ABCDEFGHIJKLMNOPQRSTUVWXYZ

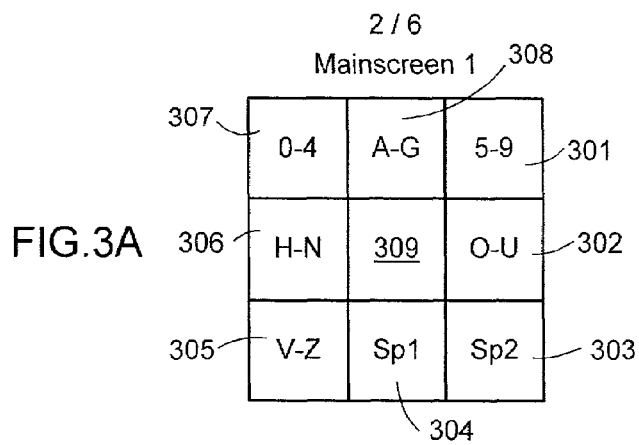

| DIAL | PHONE BOOK | MAIL |
|---|---|---|
| NETWORK | | TIMER |
| LANGUAGE | LOCK | CHARGES |

| | 0-6 | 7-# |
|---|---|---|
| CLEAR ALL | | CLEAR |
| SEND | STORE | END |

| SEARCH | STORE | EDIT |
|---|---|---|
| | | DELETE |
| | | |

| SEND | READ | OPTIONS |
|---|---|---|
| | | |
| | | |

| MANUAL | AUTO | |
|---|---|---|
| | | |
| | | |

FIG.7
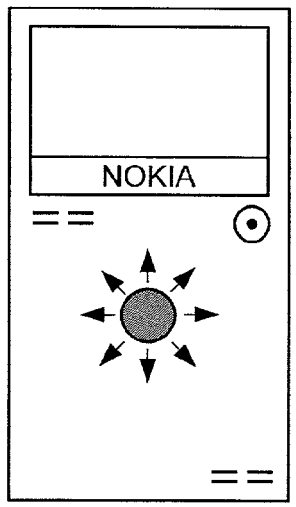
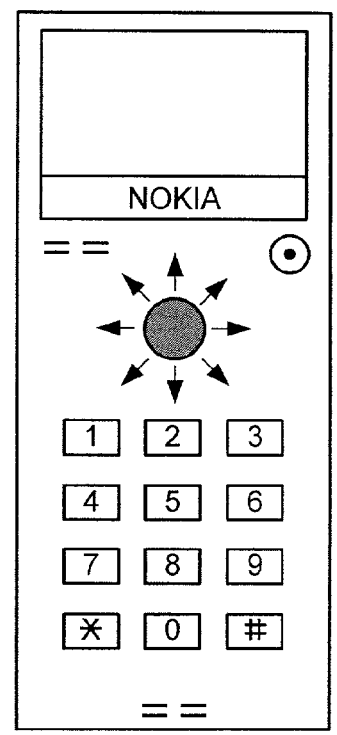
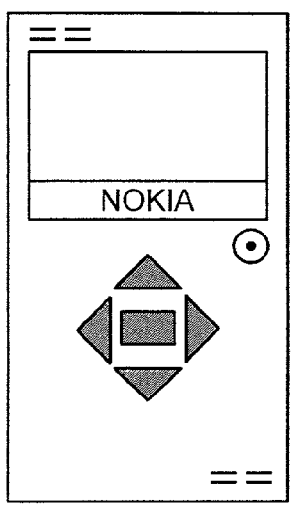

DATA INPUT

BACKGROUND OF THE INVENTION

The present invention relates to the field of portable radiotelephones, and more particularly, for inputting data into such devices.

Current portable radiotelephones provide a host of features in addition to that of making and receiving telephone calls. Such additional features include the storing and retrieving of telephone numbers and names from an internal phone book, to the sending of textual messages to other users.

Current portable radiotelephones generally comprise at a least a numeric keypad, for composing telephone numbers, and a number of additional function keys, for initiating communications to a desired telephone number, turning the radiotelephone on and off etc. It is also common for the numeric keypad to also contain alphabetic representations, for allowing the construction of textual messages. Typically, each numeric key represents three alphabetic characters, for example, the numeric key '2' often also represents characters 'A', 'B' and 'C'. During the construction of a textual message, each press of a numeric key causes a display to cycle through each character represented by that key. For example, a first press of numeric key '2' would cause the character 'A' to be displayed, a second press would cause the character 'B' to be displayed and so on. When the desired character is displayed, a further character may be entered either after a short delay, or by pressing another key. In this way textual messages may be constructed. A textual message may then be transmitted to another user in a variety of ways which will be apparent to those skilled in the art.

One problem with the above method is that the construction of textual messages is somewhat arduous since each key may require multiple presses in order to select the required character.

In order to overcome this problem, some radiotelephones now comprise typewriter style keyboards. Whilst allowing the easier entry of text, such keyboards are large and cumbersome. Radiotelephones incorporating such keyboards are thus also large. Reducing the size of such a keyboard, however, makes it increasingly difficult to select the required key, since the keys of the keyboard become smaller than the size of a finger tip, and results in an increased chance of the wrong key being pressed.

Accordingly, one aim of the present invention is to provide improved data input means for use with a portable radiotelephone.

SUMMARY OF THE INVENTION

According to a first aspect of the present invention, there is provided an apparatus for selecting an item from a predetermined set of items, the apparatus comprising: a user interface comprising an input having a plurality of actuators, and an output; control means for controlling the user interface to provide a first menu selection comprising a plurality of items not exceeding the number of actuators; and selection means responsive to operation of the actuators for selecting the item from the menu associated with the operated actuator; wherein the control means controls the user interface to provide a further menu selection in response to selection of an item, at least one item of the further menu selection representing a subset of the selected item.

This has the advantage of allowing easy menu selection with a restricted number of actuators.

The items may, for example, include menu options or functions. Alternatively, they may include a character set.

When the items are characters, the invention has the advantage of allowing easy entry of alphanumeric data into a portable radiotelephone without requiring a large keyboard. Additionally, the requirement for multiple presses of numeric keys associated with alphabetic characters is also removed. The present invention is particularly advantageous for portable radiotelephones or similar devices which do not have a keyboard due to their small size. In addition, the present invention provides a quick, accurate and efficient way of entering data in a single-handed operation.

The present invention also has advantages over pen-entry systems, such as character recognition systems, wherein a pen-like element is wiped over a touch sensitive pad and a controller attempts to interpret the movements made in order to recognise the character being written. These systems are inherently slow and difficult to use and require the user to make precise movements to ensure the correct character is recognised. Failure to make precise movements often leads to the recognition of an erroneous character. In such systems, the pen-like element is easily lost, rendering data input extremely difficult.

Advantageously, the number of selectable choices presented to the user is limited to the number of actuators of the input device. By limiting the number of selectable choices in this way, the device allows any selectable choice to be made with minimum user input.

The present invention may also be implemented to allow full or partial control of a portable radiotelephone, thereby eliminating the need for a data input keypad.

According to another aspect of the present invention, there is provided a method for controlling a user interface to select an item from a predetermined set of items, the user interface comprising an input having a plurality of actuators, and an output; the method comprising: controlling the user interface to provide a first menu selection comprising a plurality of items not exceeding the number of actuators; in response to operation of the actuators, selecting the item from the menu associated with the operated actuator; controlling the user interface to provide a further menu selection in response to selection of an item, at least one item of the further menu selection representing a subset of the selected item.

BRIEF DESCRIPTION OF THE DRAWINGS

The present invention will now be described, by way of example only, with reference to the accompanying drawings, in which:

FIG. 2 is a diagram showing a typical character set for use with a portable radiotelephone;

FIG. 3 is a diagram showing an arrangement of menu items and submenus according to one embodiment of the present invention;

FIG. 7 shows a number of portable radiotelephones incorporating the present invention.

DETAILED DESCRIPTION OF THE INVENTION

Figure 1:
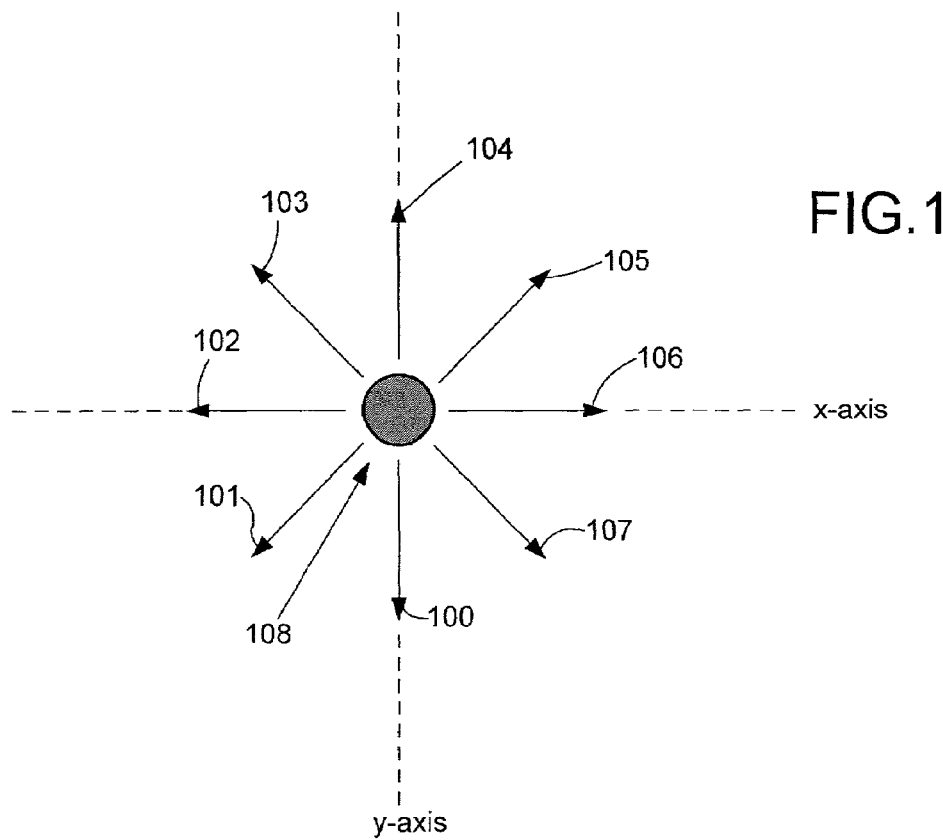
FIG. 1 is a diagram showing a representation of the directional input controls of a joystick input device.

FIG. 1 is a diagram showing a representation of the directional input controls of a joystick device having nine defined positions 100 to 108. The joystick device shown allows 8 directional control signals to be generated, depending on the position of the joystick device. Additionally, the joystick device acquires a neutral position 108, when no force is applied thereto. The joystick device as shown may be implemented using a switch array, which allows directional control signals to be generated dependent on the direction in which the joystick device is moved. Those skilled in the art will appreciate that many configurations of joystick device may be used in lieu of that described above. For instance, an analogue joystick device which uses one or more potentiometers to derive a x and y-axis displacement may also be used, with suitable control circuitry. It will also be apparent that a joystick device having more or less defined positions, including a mouse or track-wheel, will also be suitable without detracting from the inventive concepts of the present invention. Further, an arrangement of cursor keys capable of generating suitable directional control signals will also be suitable.

FIG. 2 is a diagram showing a typical character set for use with a portable radiotelephone using the English language. Characters $X_1$ to $X_{11}$ represent special characters which can be used, for example, for foreign or accented characters, mathematical symbols, etc.

FIG. 3 is a diagram showing an arrangement of menu items and submenus according to one embodiment of the present invention. FIG. 3a shows a first menu screen which is presented to a user when alphanumeric entry is required by a portable radiotelephone, such as when composing a textual message to be sent to another user. The menu screen is presented, on a display device such as an LCD screen, as a matrix of blocks 301 to 309, the arrangement of which matches the defined positions of the joystick device of FIG. 1. In an alternative embodiment, the matrix is replaced by a series of segments arranged to coincide with positions of the input device. It will be appreciated that the block or segment positions do not have to match the defined positions of the joystick device.

Each of the blocks 301 to 308 represents a sub-set of the character set shown in FIG. 2. For example, block 308 represents the characters A to G, block 306 represents the characters H to N etc. A user may select any one of the blocks 301 to 308 using the joystick device. As the joystick device is pushed, the block which corresponds to the direction in which the joystick device was pushed is highlighted. For example if the user wants to choose the character 'D' for inclusion in a text message, the joystick device is pushed upwards and block 308 is highlighted. Highlighting may take the form of inverting the pixels representing that block, displaying a border around the block, or such like. As the joystick device is moved around, a block is highlighted according to the position of the joystick device. When the desired block is highlighted, the user can select the highlighted block.

In a preferred embodiment of the present invention, the selection of a desired block is achieved by maintaining the joystick device in the position corresponding to the desired block for a given time period. For example, to select the block 308, the user first of all pushes the joystick device upwards, which highlights the block 308. By maintaining the pressure on the joystick device in the same direction for, for example, 0.5 seconds, the highlighted block in selected.

The time period required before selection takes place is dependent on user preferences. For example, an experienced user may wish the time period to be decreased, thereby increasing the speed at which data can be input. Alternatively, a novice user may wish the time period to be increased. Preferably, the time period is user selectable, with a default setting of around 0.5 to 1.5 seconds. In another embodiment of the present invention, the user selects a block, after first highlighting the block, by allowing joystick device to return to its neutral position 108. If the joystick device is left in the neutral position for a short period of time, the currently highlighted block is selected. Alternatively, the user may press a selection button to select the current highlighted block. The selection button may or may not form part of the joystick device, or may be activated by pushing downwards on the joystick device axis.

Once a block is selected, the first menu screen is replaced by a submenu screen. The contents of the submenu screen are dependent on the previous block selected. If, in the above example, the block 308 was selected, the subscreen 2 as shown in FIG. 3c will be presented to the user. Each of the blocks of submenu screen 2 represent individual characters. To select a character, the joystick device is moved in the direction of the required character to highlight the appropriate block. Once the required block is highlighted, it may be selected as described above. Once selected, the chosen character can be added to a text message, to enable a textual message to be constructed. The selection of lower-case characters may be implemented by a separate 'shift' key, or they may be represented as individual characters as described above. In an alternative embodiment, the portable radiotelephone displays the first character selected in upper case, and subsequent characters in lower case until a full stop is selected, in which case the next character selected would be displayed in upper case and so on.

FIGS. 3b to 3i show examples of a number of submenu screens which may be used according to the present invention. Using the selection methods outlined above, it is clear how any character from the character set shown in FIG. 2 can be selected using only two joystick movements. This provides both a quick and an accurate way of inputting alphanumeric characters to a device such as a portable radiotelephone. Through practice, a user may quickly become adept in selecting the desired characters through appropriate joystick movements, much in the way that writing is learned. In particular, this method of data entry is particularly advantageous in portable radiotelephones which do not have a keypad, for example on very small or wearable devices, where the size of an incorporated keypad would be too small to operate using the fingers.

Each of submenu screens shown in FIG. 3 preferably include at least one blank block. FIG. 3b, for example, shows the presence of a blank block in the upper left corner. The position of the blank block corresponds to the position which was required to select that submenu screen in the main menu screen. For example, if block 307 of FIG. 3a was selected, the top left block in the associated submenu screen will be blank. Correspondingly, if block 308 of FIG. 3a was selected, the corresponding block in the associated submenu screen will be blank. This arrangement helps prevent the accidental selection of characters caused by holding the joystick for too long in a given position.

It is, however, possible for every block in the matrix to be used. Additionally functionality may also be implemented, for example, the provision of a 'back' block, to allow the parent screen of any submenu screen to be presented to the user. This feature is particularly useful when a submenu screen is erroneously selected.

FIG. 3 shows one possible arrangement of the characters in the submenu screens. In an alternative embodiment, improvements to the user interface may be achieved by specific grouping of the characters. For example, by grouping all vowels together in one submenu screen will allow vowels to be selected quickly. Additionally, characters may be grouped according to their distribution in a particular language. For example, the letters 'e, a, i, t,' etc may be grouped together as they occur frequently in the English language.

Figures 4, 4A, 4B, 4C:
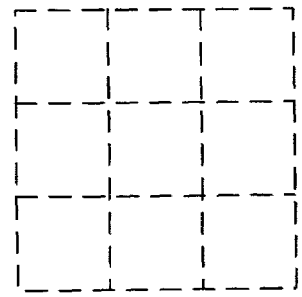
FIG. 4 is a diagram showing a further arrangement of menu items and submenus according to a further embodiment of the present invention.

It will be appreciated that the invention can also be implemented to control the entire functionality of a portable radiotelephone. FIG. 4a shows an example of a menu screen wherein each block represents a menu item for controlling the functionality of a portable radiotelephone.

For example, if a user wishes to dial a subscriber number and initiate a call, the user would select the 'dial' menu in the manner described above. Selecting the 'dial' menu would cause the arrangement shown in FIG. 4b to be presented to the user. Using the techniques described above, the user can quickly compose a subscriber number and, using the 'send' option, initiate a telephone call with the chosen subscriber.

It is apparent that the techniques described above can be used for a wide range of uses, from constructing textual messages, to controlling the entire or partial functionality of a portable radiotelephone. Such a system could be used to replace the need for a keypad on a portable radiotelephone, with all control and data input effected by the joystick device.

In yet a further embodiment of the present invention, a joystick lock facility is provided. This is to prevent unwanted selection of menus etc. through unintentional movement of the joystick device whilst stored in a pocket, handbag etc. A joystick lock menu is selected in the manner described above. Once locked, no further joystick inputs are accepted until the joystick device has highlighted a predetermined number of blocks, in a predetermined order, within a predetermined time period. FIG. 4c shows one possible joystick lock screen, which is displayed once the joystick lock has been applied. In order to unlock the joystick, the joystick device must first highlight the block 410, followed by the block 411, the block 412 and finally the block 413. If a block is selected out of sequence, the sequence must be restarted. The blocks must be selected in the correct order, within a given time period in order for the joystick lock to be removed. The time period should allow the average user adequate time to accurately select the required blocks, whilst not being excessively long so as to reduce the risk of unintentional selection. Such a sequence is preferably such that it is unlikely to be carried out through unintentional movement of the joystick device, whilst in a pocket or handbag etc.

Figure 5:
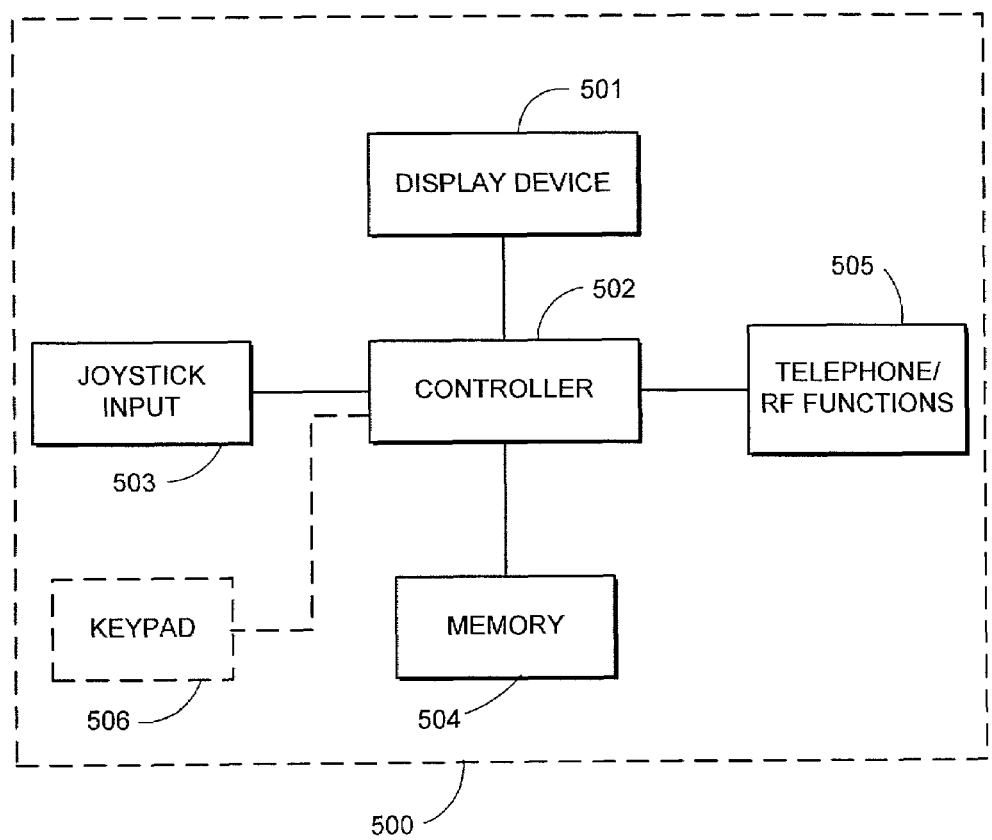
FIG. 5 is a block diagram showing a portable radiotelephone according to the present invention.

FIG. 5 is a block diagram showing a portable radiotelephone 500 according to the present invention. A display device 501 is used for displaying or presenting textual or graphical information to a user. In an alternative embodiment of the present invention, the display device could be complemented by, or even replaced by, a speech synthesiser or other sensory means. The display device is connected to and controlled by a controller 502. The controller 502 accepts control signals from a joystick or other input device 503. The controller interprets the signals from the joystick device 503 which are made in response to information presented to the user on the display device 501. Optionally, a keypad 506 may also be connected to the controller 502. Such a keypad may be used for the inputting of further control signals, such as switching the portable radiotelephone on or off, or other typical functions found on such devices. A memory 504 is also connected to the controller 502. The memory 504 may be used to store, for example, textual messages constructed by the user, received messages from external users, user options, factory defaults etc. Finally, a telephone function module 505 is connected to the controller 502. The telephone function module 405 enables communication to be established with a telecommunications network, enabling calls to be made and received, textual or graphical messages to be sent or received, etc. The telephone function module 405 provides the typically functionality expected to found on a portable radiotelephone, as will be appreciated by those skilled in the art.

Figure 6:
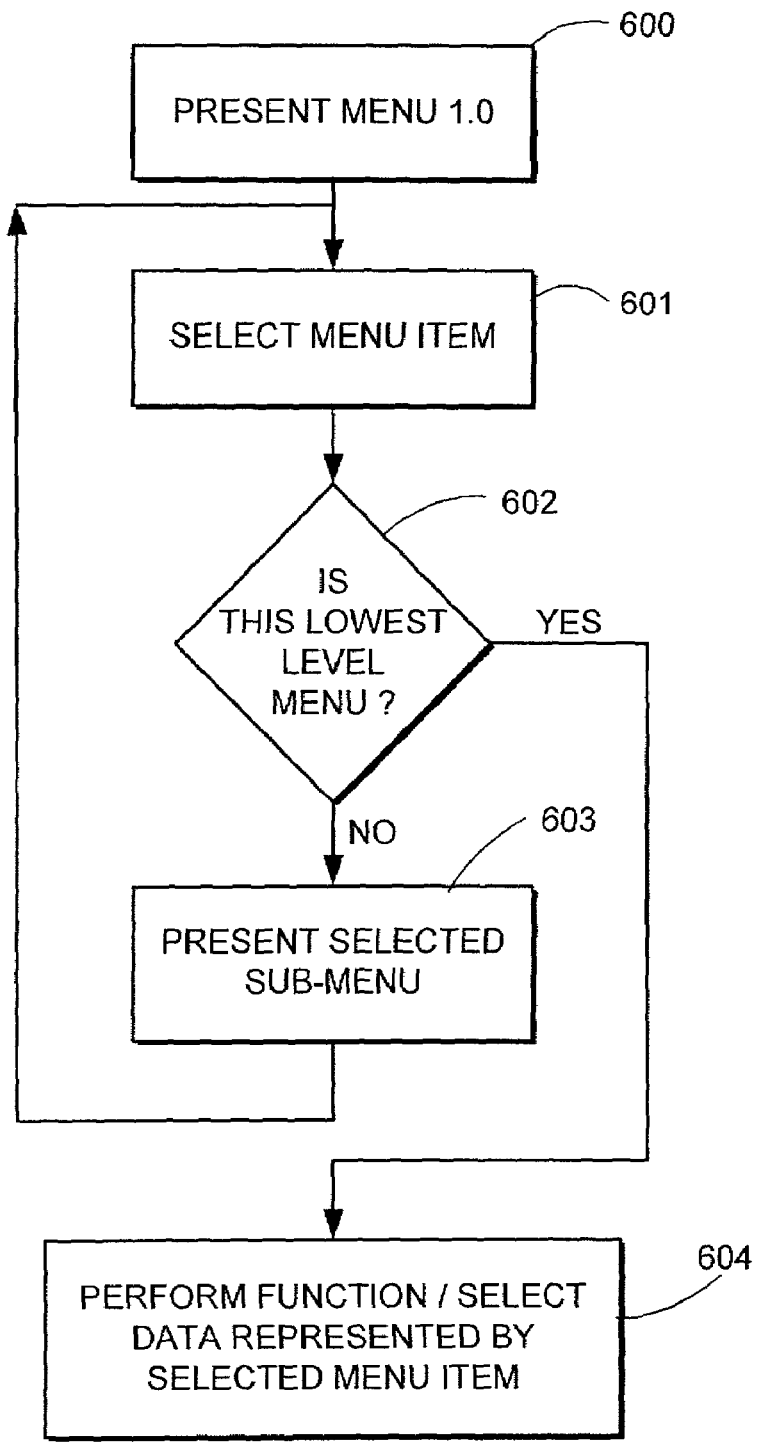
FIG. 6 is a flow diagram showing an example of how the controller of FIG. 5 operates according to one embodiment of the present invention.

FIG. 6 is a flow diagram showing an example of how the controller 502 of FIG. 5 operates according to one embodiment of the present invention.

Step 600 causes a menu screen to be presented to the user, via the display device 401. In step 601, the controller 402 interprets movements made on the joystick device 403 to control the highlighting of menu items, as described above. The controller 402 decides when a selection of a menu item has been made according to the methods outlined above. Step 602 checks to see whether the menu or item selected has any associated submenu screens associated therewith. If a submenu screen is associated with the menu item selected, step 603 causes that submenu screen to be displayed. The user is then free to select an item from the submenu screen according to step 601. If, however, there is no submenu screen associated with the item selected, step 604 causes the function represented by the selected menu item to be performed, or selects the data represented by that menu item. The process is then repeated.

Although the present invention is described above with reference to one level of subscreen, it will be apparent that any number or arrangement of submenu screens could be used, providing that the lowest level of subscreen allows selection of a single character, number or function etc. In this way, complex character sets, such as Chinese, can be quickly and easily be used.

What is claimed is:

1. An apparatus for selecting an item from a predetermined set of menu items organized in a menu comprising a first and second menu levels, the apparatus comprising:
   a user interface comprising an input having a plurality of actuators, and an output;
   control means for controlling the user interface to provide a first menu selection corresponding to the first menu level and comprising a first number of menu items not exceeding the number of actuators, wherein different menu items are associated with different actuators; and
   selection means responsive to operation of any one of the actuators for selecting from the menu a first item associated with the operated actuator;
   wherein the control means is configured to control the user interface to provide, corresponding to the second menu level, a second menu selection comprising a second number of menu items in response to selection of the first item so that at least one menu item of the second menu selection represents a subset of the first item, the second number being less than the first number and the actuator operated to select the first item is never associated with a menu item of the second selection.

2. An apparatus as claimed in claim 1, wherein the first input comprises key means.

3. An apparatus as claimed in claim 2, wherein plurality of actuators of the key means are keys.

4. An apparatus as claimed in claim 1, wherein the input comprises a multipositional device.

5. An apparatus as claimed in claim 4, wherein the multipositional device is a joystick.

6. An apparatus as claimed in claim 1, wherein the second menu selection comprises less items than the number of actuators.

7. An apparatus as claimed in claim 2, wherein the further menu selection comprises a plurality of items not exceeding the number of actuators.

8. An apparatus as claimed in claim 3, wherein the further menu selection comprises a plurality of items not exceeding the number of actuators.

9. An apparatus as claimed in claim 4, wherein the further menu selection comprises a plurality of items not exceeding the number of actuators.

10. An apparatus as claimed in claim 1, wherein the further menu selection comprises a plurality of items not exceeding the number of actuators.

11. An apparatus as claimed in claim 5, wherein the further menu selection comprises a plurality of items not exceeding the number of actuators.

12. An apparatus according to claim 1, wherein the control means has been further configured to control the user interface to associate one of the actuators with a buck function and on operation of the key associated with the back function to return from the second menu level to the first menu level.

13. A method for controlling a user interface to select an item from a predetermined set of items organized in a menu comprising a first and second menu levels starting from the first menu level followed by the second menu level, the user interface comprising an input having a plurality of actuators, and an output; the method comprising:
controlling the user interface to provide a first menu selection corresponding to the first multi level and comprising a first number of menu items nor exceeding the number of actuators;
associating different menu items with different actuators;
in response to operation of the actuators, selecting from the menu a first item associated with the operated actuator,
controlling the user interface to provide, corresponding to the second menu level, a second menu selection comprising a second number of menu items in response to selection of the first item and to represent a subset of the first item, wherein the second number is less than the first number and the actuator operated to select the first item is never associated with a menu item of the second menu selection.

14. A method as claimed in claim 13, wherein the second menu selection comprises a plurality of items not exceeding the number of actuators.

15. The method according to claim 13, further comprising associating one of the actuators with a back function and on operation of the key associated with the back function returning from the second menu level to the first menu level.

16. The method according to claim 13, wherein the input is a multipositional device.

17. The method according to claim 16, wherein the multipositional device is a joystick.

18. An apparatus for selecting an item from a predetermined set of menu items organized in a menu comprising a first menu level and a second menu level, the apparatus comprising:
a user interface comprising an input having a plurality of actuators, and an output;
control means for controlling the user interface to provide a first menu level comprising no more menu items than the number of actuators, wherein different actuators are associated with different menu items;
selection means responsive to operation of any one of the actuators for selecting from the first menu level a menu item to which the operated actuator is associated,
wherein the control means is configured to control the user interface to provide a second menu level, dependent upon the identity of the selected menu item, that has less menu items than the number of actuators and wherein one or more of the actuators, but never the actuator operated to select the first item, are each associated with a different menu item of the second level.

19. An apparatus for selecting an item from a predetermined set of menu items organized in a menu comprising a first menu level and a second menu level, the apparatus comprising:
a user interface comprising an input having a plurality of actuators, and an output;
control means for controlling the user interface to provide a first menu level comprising no more menu items than the number of actuators, wherein different actuators are associated with different menu items;
selection means responsive to operation of any one of the actuators for selecting from the first menu level a menu item to which the operated actuator is associated;
wherein the control means is configured to control the user interface to provide for each of the menu items of the first level, when selected, a second menu level, dependent upon the identity of the selected menu item, that has less menu items than the number of actuators and wherein one or more of the actuators, but not the actuator operated to select the first item, are each associated with a different menu item of the second level.

20. An apparatus for selecting an item from a predetermined set of menu items organized in a menu comprising a first menu level and a second menu level, the apparatus comprising:
a user interface comprising an input having a plurality of actuators, and an output;
control means for controlling the user interface to provide a first menu level comprising no more menu items than the number of actuators, wherein different actuators are associated with different menu items;
selection means responsive to operation of any one of the actuators for selecting from the first menu level a menu item to which the operated actuator is associated;
wherein the control means is configured to control the user interface to provide a second menu level, dependent upon the identity of the selected menu item, that has less menu items than the number of actuators, wherein each menu item of the second level is associated with a different actuator chosen from the group comprising the plurality of actuators but excluding the actuator operated to select the first item.

* * * * *

UNITED STATES PATENT AND TRADEMARK OFFICE
CERTIFICATE OF CORRECTION

PATENT NO. : 7,079,115 B2 Page 1 of 1
APPLICATION NO. : 09/893419
DATED : July 18, 2006
INVENTOR(S) : Arnold It is certified that error appears in the above-identified patent and that said Letters Patent is hereby corrected as shown below:

Column 7,
Line 27, "buck" should read --back--;
Line 38, "multi" should read --menu--;
Line 39, "nor" should read --not--.

Signed and Sealed this

Thirteenth Day of February, 2007

JON W. DUDAS
*Director of the United States Patent and Trademark Office*